United States Patent
Leisgang et al.

(10) Patent No.: US 11,463,162 B2
(45) Date of Patent: Oct. 4, 2022

(54) HIGH AVAILABILITY SCALABLE MULTI-SOURCE VIRTUALIZED SPECTRUM SIGNAL PROCESSING SYSTEM

(71) Applicant: Maxar Space LLC, Palo Alto, CA (US)

(72) Inventors: Thomas C. Leisgang, Scotts Valley, CA (US); William H. Gray, Santa Clara, CA (US)

(73) Assignee: Maxar Space LLC, Palo Alto, CA (US)

(*) Notice: Subject to any disclaimer, the term of this patent is extended or adjusted under 35 U.S.C. 154(b) by 59 days.

(21) Appl. No.: 16/434,481

(22) Filed: Jun. 7, 2019

(65) Prior Publication Data
US 2020/0244351 A1    Jul. 30, 2020

Related U.S. Application Data

(60) Provisional application No. 62/798,150, filed on Jan. 29, 2019.

(51) Int. Cl.
*H04B 7/185* (2006.01)

(52) U.S. Cl.
CPC .................. *H04B 7/18582* (2013.01)

(58) Field of Classification Search
None
See application file for complete search history.

(56) References Cited

U.S. PATENT DOCUMENTS

| | | | |
|---|---|---|---|
| 2011/0148697 A1* | 6/2011 | Thiel | G01S 19/24 342/357.26 |
| 2016/0192166 A1* | 6/2016 | deCharms | H04L 65/1096 348/14.02 |

(Continued)

FOREIGN PATENT DOCUMENTS

| | | |
|---|---|---|
| EP | 2339378 A1 | 6/2011 |
| WO | WO00/49738 A1 | 8/2000 |
| WO | WO01/63316 A1 | 8/2001 |

OTHER PUBLICATIONS

Extended European Search Report dated Jun. 24, 2020, European Application No. 19212311.5.

(Continued)

*Primary Examiner* — Chi H Pham
*Assistant Examiner* — Raul Rivas
(74) *Attorney, Agent, or Firm* — Vierra Magen Marcus LLP

(57) ABSTRACT

A scalable signal processing system is disclosed that processes digitized spectrum received from a constellation of satellites (or other sources), extracting multiple digital signals from multiple sources through multiple acquisition sites that is virtualized with high availability. A system of one or more antennas can receive a range of frequencies of raw spectrum covering multiple visible orbit planes, where a single antenna can receive signals from multiple satellite concurrently. This can be particularly useful when establishing a constellation satellites, where a number of satellites can be grouped together within an antenna's field of view. A group of digitizers receive the signals from the antennas and creates raw samples to form a spectrum sample pool. The spectrum sample pool is stored in a raw frame archive, where the digitizers and raw frame archive can be co-located and can also be co-located with one or more of the antennas.

21 Claims, 11 Drawing Sheets

(56) References Cited

U.S. PATENT DOCUMENTS

| | | | |
|---|---|---|---|
| 2017/0123929 A1* | 5/2017 | Helleren | G06F 9/505 |
| 2017/0126310 A1* | 5/2017 | Petrovic | H04W 24/08 |
| 2018/0157255 A1* | 6/2018 | Halverson | B64C 39/024 |
| 2018/0364361 A1 | 12/2018 | Liu et al. | |

OTHER PUBLICATIONS

Response to Extended European Search Report dated Feb. 5, 2021, European Patent Application No. 19212311.5.
Communication under Rule 71(3) EPC dated Jul. 7, 2021, European Patent Application No. 19212311.5.

\* cited by examiner

Field of Regard

HIGH AVAILABILITY SCALABLE MULTI-SOURCE VIRTUALIZED SPECTRUM SIGNAL PROCESSING SYSTEM

CROSS-REFERENCE TO RELATED APPLICATION

This application claims the benefit of U.S. Provisional Patent Application No. 62/798,150, "HIGH AVAILABILITY SCALABLE MULTI-SOURCE VIRTUALIZED SPECTRUM SIGNAL PROCESSING SYSTEM," filed on Jan. 29, 2019, which is hereby incorporated by reference in its entirety.

BACKGROUND

The present disclosure relates to technology for satellite communication systems.

Satellite communication systems typically include one or more satellites and a set of ground terminals, with ground antennas used to monitor the trajectories and health of the satellites. For a constellation of satellites, such as a low earth orbit (LEO) constellation, this can require the monitoring of a large number of satellites, which in turn requires a large number of antennas. The cost and complexity of the system of the multiple antennas needed to monitor the constellation can be a particular problem during the formation of a constellation, when multiple satellites are launched on the same rocket and deployed in a common region of the sky as even though multiple satellites may be within the field of view of a single antenna, multiple antennas are still needed to individually monitor the satellites.

DETAILED DESCRIPTION

A scalable signal processing system is disclosed that processes digitized spectrum received from a constellation of satellites (or other sources), extracting multiple digital signals from multiple sources through multiple acquisition sites that is virtualized with high availability. A system of one or more antennas can receive a range of frequencies of raw spectrum covering multiple visible orbit planes, where a single antenna can receive signals from multiple satellite concurrently. This can be particularly useful when establishing a constellation satellites, where a number of satellites can be grouped together within an antenna's field of view. A group of digitizers receive the signals from the antennas and creates raw samples to form a spectrum sample pool. The spectrum sample pool is stored in a raw frame archive, where the digitizers and raw frame archive can be co-located and can also be co-located with one or more of the antennas.

The digitizers and the raw frame archive can be accessed for sample processing and be spread across multiple cores to process the raw frames in parallel. The processing cores can be implemented as replicated virtual machines (VMs) that allow for redundancy and continuous operation in care of a core failing. The raw frames are processed to extract the signals of the individual satellites, where the signal of each satellite has an individual center frequency within the spectral range. The processed frames can be stored in a processed frame archive, and the processed frames can be supplied form the processing cores and the processed frame archive to applications and data bases.

Figure 1:
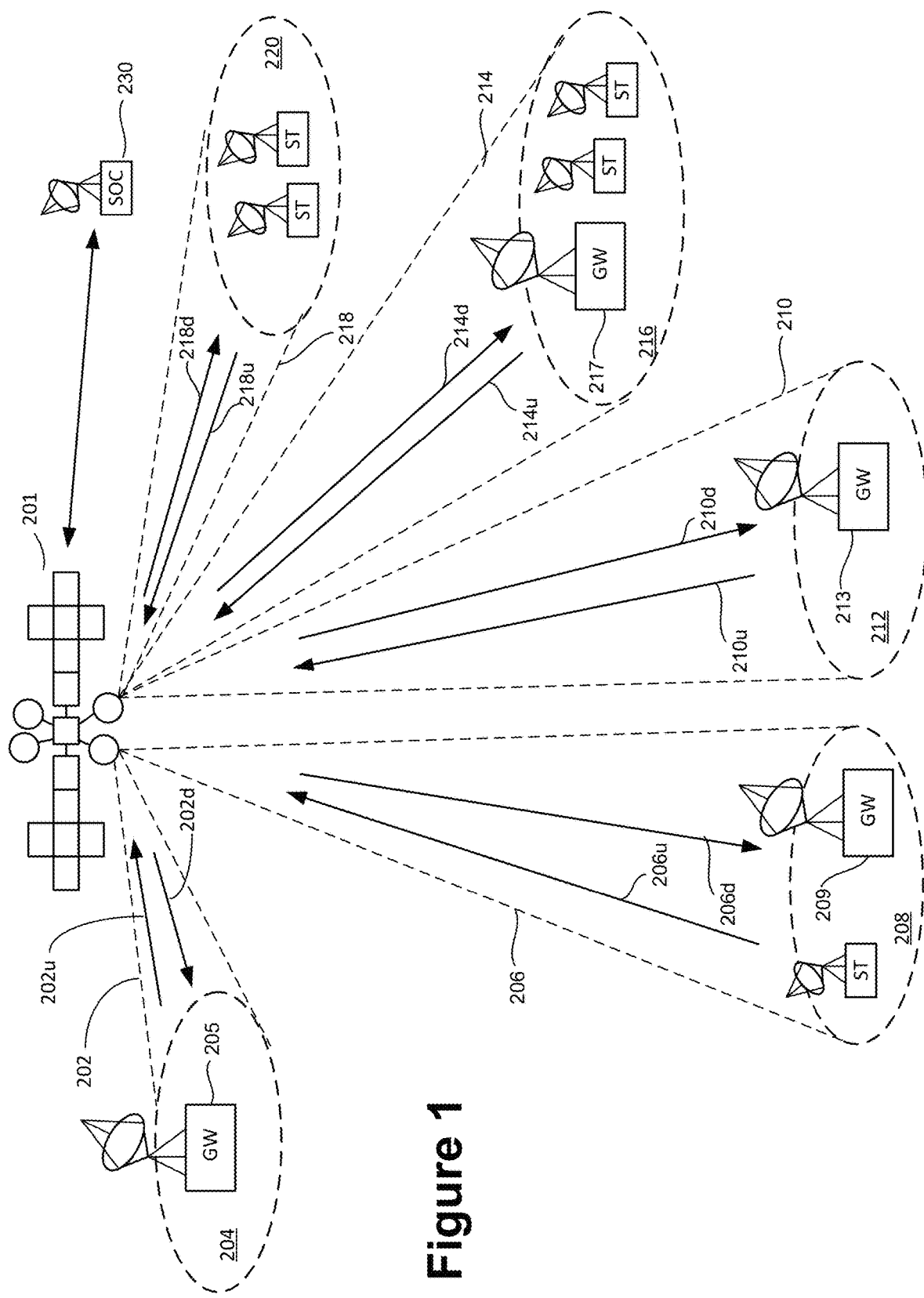
FIG. 1 is a block diagram describing one embodiment of a portion of a satellite communications system.

FIG. 1 is a block diagram depicting a portion of a satellite communications system that includes one or more satellites. FIG. 1 depicts satellite 201, which is a non-geostationary satellite. A geostationary satellite moves in a geosynchronous orbit (having a period of rotation synchronous with that of the Earth's rotation) in the plane of the Equator, so that it remains stationary in relation to a fixed point on the Earth's surface. This orbit is often achieved at an altitude of 22,300 miles (35,900 km) above the earth; however, other altitudes can also be used. A non-geostationary satellite is a satellite that is not a geostationary satellite and is not in an orbit that causes the satellite to remain stationary in relation to a fixed point on the Earth's surface. Examples of non-geostationary satellites include (but are not limited to) satellites in Low Earth Orbits ("LEO"), Medium Earth Orbits ("MEO") or Highly Elliptical Orbits ("HEO"). Although FIG. 1 only shows one satellite, in some embodiments (as described below) the system will include multiple satellites that are referred to as a constellation of satellites.

In one embodiment, satellite 201 comprises a bus (i.e., spacecraft) and one or more payloads, including a communications payload. The satellite may also include multiple power sources, such as batteries, solar panels, and one or more propulsion systems, for operating the bus and the payload. The example of satellite 201 includes an antenna system that provides a plurality of beams, including non-articulated and steerable spot beams, for communicating with subscriber terminals and gateways.

A subscriber terminal is a device that wirelessly communicates with a satellite, usually to be used by one or more end users. The term subscriber terminal may be used to refer to a single subscriber terminal or multiple subscriber terminals. A subscriber terminal is adapted for communication with the satellite communication system including satellite 201. Subscriber terminals may include fixed and mobile subscriber terminals including, but not limited to, a cellular telephone, wireless handset, a wireless modem, a data transceiver, a paging or position determination receiver, or mobile radiotelephone, a cellular backhaul, a trunk, an enterprise computing or storage device, an airborne device, a maritime device or a head end of an isolated local network. A subscriber terminal may be hand-held, portable (including vehicle-mounted installations for cars, trucks, boats, trains, planes, etc.) or fixed as desired. A subscriber terminal may be referred to as a wireless communication device, a mobile station, a mobile wireless unit, a user, a subscriber, a terminal or a mobile.

The term gateway may be used to refer to a device that communicates wirelessly with a satellite and provides an interface to a network, such as the Internet, a wide area network, a telephone network or other type of network. In some embodiments, gateways manage the subscriber terminals.

FIG. 1 also shows a Satellite Operations Center 230, which includes an antenna and modem for communicating with satellite 201, as well as one or more processors and data storage units. Satellite Operations Center 230 provides commands to control and operate satellite communication payload 201, as well as all other satellite communication payloads in the constellation. Satellite Operations Center 230 may also provide commands to any of the gateways (via a satellite or a terrestrial network) and/or subscriber terminals.

In one embodiment, satellite 201 is configured to provide two hundred fixed (i.e., non-articulated so that they are fixed in relation to satellite 201) spot beams that use time domain beam hopping among the spot beams. In other embodiments, more or less than two hundred spot beams can be used for the time domain beam hopping. In one embodiment, the two hundred hopping beams are divided into thirty six hopping groups such that one beam in each group is active at a given time; therefore, thirty six of the two hundred spot beams are active at an instance in time. In addition to the two hundred non-articulated spot beams that perform time domain beam hopping, one embodiment of satellite 201 includes eight 4.2 degree steerable spot beams used to communicate with gateways. In other embodiments, more or less than eight can be used. Additionally, satellite 201 includes six 2.8 degree steerable spot beams which can have a dual purpose of communicating with gateways and/or providing high capacity communication for subscriber terminals that would otherwise fall under the hopping beams of the two hundred spot beams performing time domain beam hopping. Other embodiments can use different sized spot beams.

For example purposes only, FIG. 1 shows five spot beams: 202, 206, 210, 214 and 218. Spot beam 202 is a 4.2 degree steerable spot beam that illuminates coverage area 204 for communicating with one or more gateways 205 via downlink 202d and uplink 202u. Spot beam 206 is a 2.8 degree steerable dual purpose beam that illuminates coverage area 208 in order to communicate with one or more gateways 209 and one or more subscriber Terminals ST via downlink 206d and uplink 206u. Spot beam 210 is a 2.8 degree steerable spot beam that could be used to communicate with gateways and/or subscriber terminals ST, but in the example of FIG. 1 spot beam 210 illuminates coverage area 212 to communicate with one or more gateways 213 via downlink 210d and uplink 210u. The two hundred spot beams that perform time domain beam hopping can be used to communicate with subscriber terminals and/or gateways. Spot beams 214 and 218 are two examples of the two hundred non-articulated spot beams that performed time domain beam hopping. Spot beam 214 illuminates coverage area 216 to communicate with one or more gateways 217 and one or more subscriber terminals ST via downlink 214d and uplink 214u. Spot beam 218 illuminates coverage area 220 to communicate with subscriber terminals ST via downlink 218d and uplink 218u.

Figure 2:
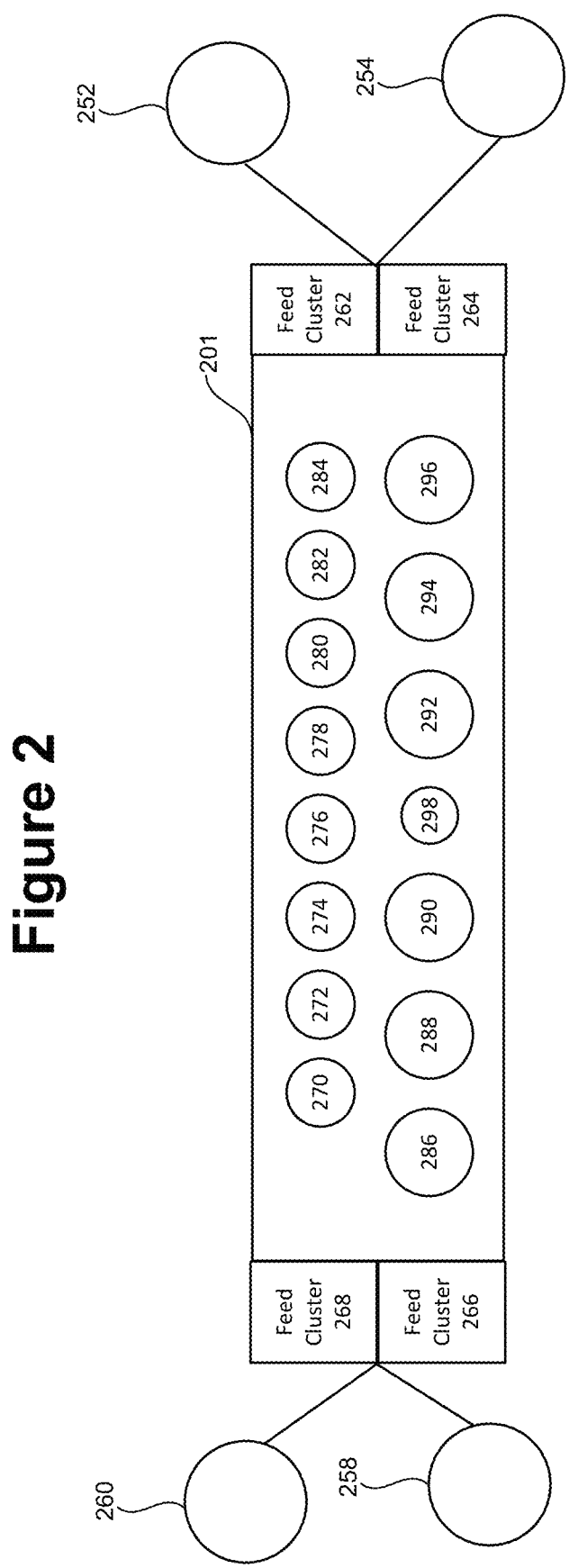
FIG. 2 is a block diagram depicting a satellite and its antenna system.

FIG. 2 is a block diagram depicting more details of one embodiment of an antenna system of satellite 201. For example, FIG. 2 shows antennas 252, 254, 258 and 260 which provide the two hundred spot beams that implement time domain beam hopping. Each of antennas 252, 254, 258 and 260 provide fifty spot beams each. FIG. 2 shows feed cluster 262 pointed at antenna 252, feed cluster 264 pointed at antenna 254, feed cluster 266 pointed at antenna 258 and feed cluster 268 pointed at antenna 260. Additionally, satellite 201 includes six 2.8 degree steerable antennas for communicating with gateways and/or providing high capacity beams for subscriber terminals, including antennas 286, 288, 290, 292, 294 and 296. Satellite 201 also includes eight 4.2 degree steerable antennas for communicating with gateways, including antennas 270, 272, 274, 276, 278, 280, 282 and 284. In one embodiment, the antennas are mechanically steerable. In another embodiment, a phased array or other means can be used to electronically steer the spot beams. Satellite 201 also includes an antenna 298 for communicating with satellite operations center 230 in order to provide telemetry and commands to satellite 201, and provide status and other data back to satellite operations center 230.

Figure 3:
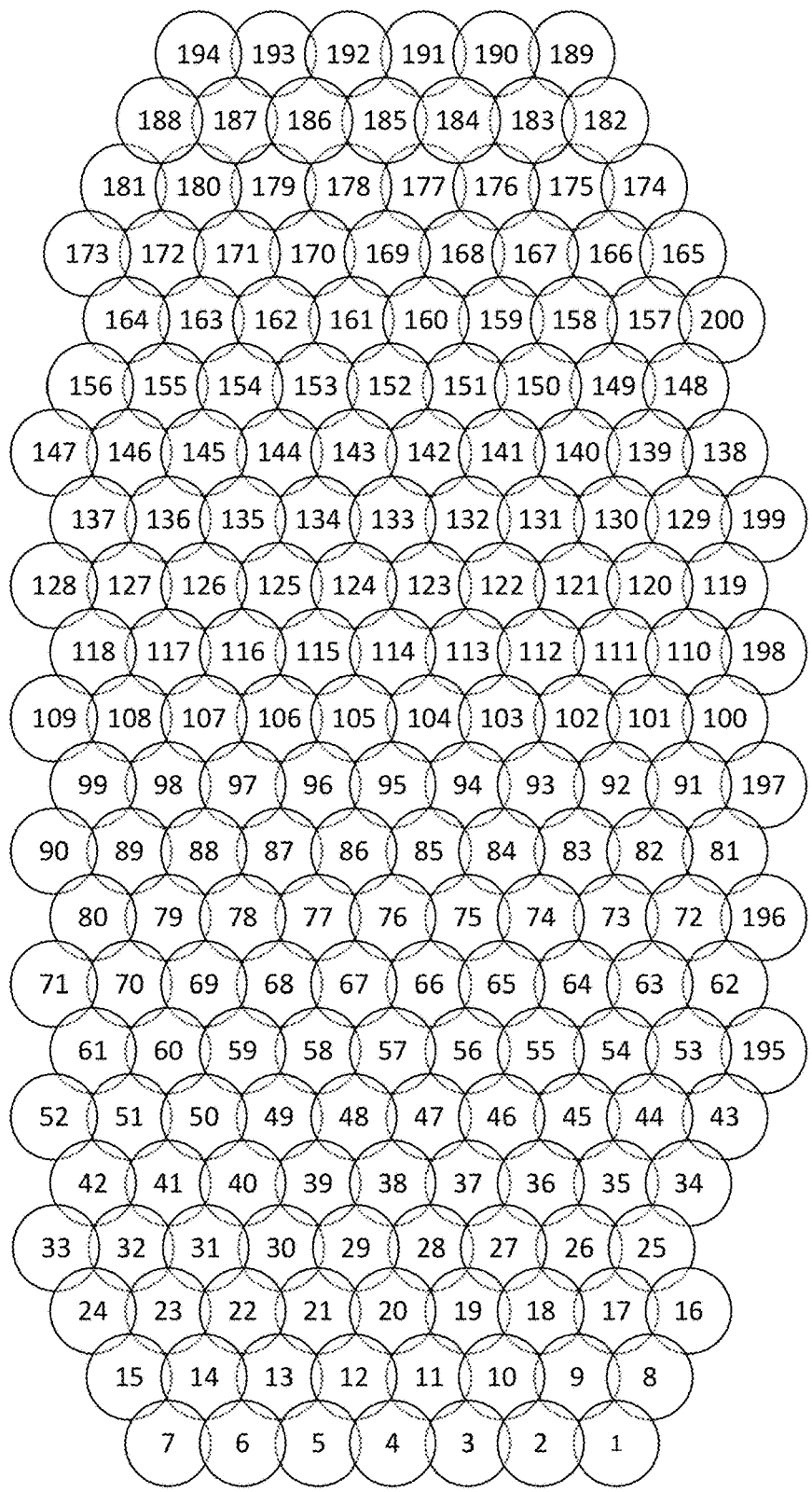
FIG. 3 depicts a beam map for a Field of Regard.

Antenna 298, or any of the other antennas, can also be used to provide a beacon signal. In some embodiments, satellite 201 can include an additional antenna for providing the beacon signal. In traditional satellites, the beacon signal provides subscriber terminals and gateways with a gauge to determine how much power should be used. A terminal on the ground can transmit a signal which the satellite will use to generate a corresponding downlink, which can then be compared to the strength of the beacon signal, and then can adjust its power up or down to match the beacon signal. The beacon signal can also be used to determine when a satellite is not operational. Additionally, beacon signals can be used to compensate for Doppler shift. Since the terminals knows the beacon is supposed to be on a certain frequency, it can calculate its Doppler based on the current reception of the beacon signal. A collection of satellites can transmit information to, and receive information from, such a beacon FIG. 3 provides an example beam map for the two hundred non-articulated spot beams of satellite 201 that implement time domain beam hopping. In one embodiment, those spot beams are fixed in direction, relative to satellite 201. As can be seen, the two hundred spot beams depicted in FIG. 3 are numbered 1-200. In one embodiment, the spot beams overlap; for example, the −5 dB contour of each spot beam overlaps with the −5 dB contour of other spot beams neighboring it. All the spot beams together comprise the Field of Regard of satellite 201. The Field of Regard of the satellite is different than the Field of View of the satellite. For example, the Field of Regard is the target area that the satellite can see/communicate based on its position. Thus, the entire beam map of FIG. 3 is the Field of Regard. In contrast, the Field of View is the area that the satellite's payload can actually see at an instance in time. For example, when performing time domain beam hopping, only a subset of those spot beams depicted in FIG. 3 are active at a given time. Therefore, the Field of View is less than the Field of Regard.

Figure 4:
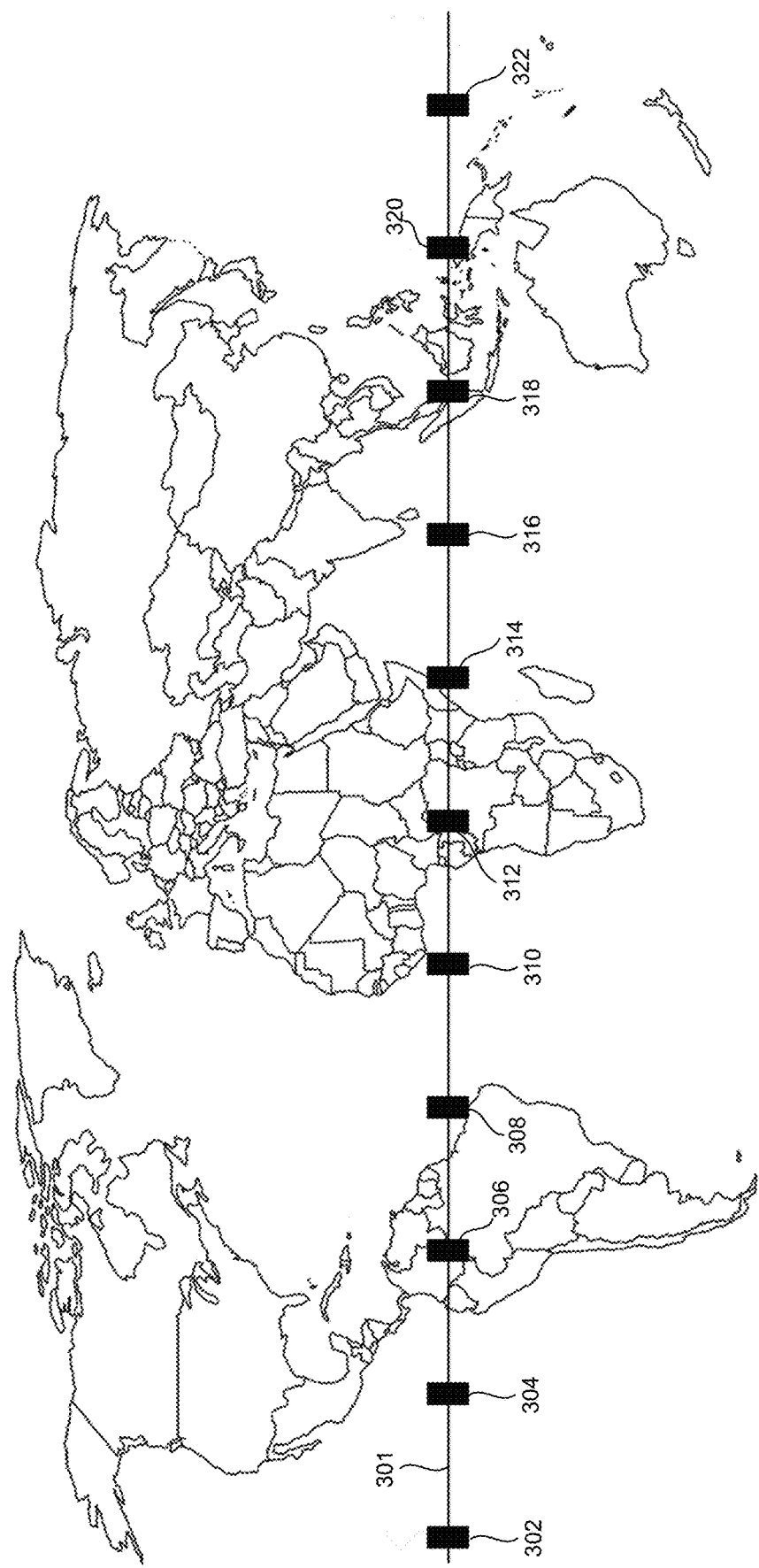
FIG. 4 is a map of the world, showing a constellation of satellites.

In one embodiment, satellite 201 is only one satellite of a larger constellation of satellites that implement the satellite communication system, which can be a constellation of geostationary satellites, LEO satellites or MEO satellites, for example. In one example embodiment, the satellite constellation includes eleven satellites, with each satellite having the same structure as satellite 201. However, each of the satellites can be independently programmed to implement the same or different time domain beam hopping plans, as will be explained below. FIG. 4 is a map of the world showing eleven geostationary, LEO or MEO satellites 302, 304, 306, 308, 310, 312, 314, 316, 318, 320, and 322, such as part of a constellation. In one embodiment, all eleven satellites are in orbit about the Equator in an equatorial LEO or MEO 301. In one example, all eleven satellites are moving in the same orbital direction along the same orbital path and are equally spaced apart from each other. Because the satellites are in a LEO or MEO orbit, they are non-geostationary, meaning that they will move with respect to any location on the Earth. As the satellites move in orbit, the user and gateway spot beams' coverage areas will drift across the Earth's surface with the satellites. In one example, for MEO satellites there will be a drift rate of 360 degrees longitude every six hours, or one degree per minute. In such embodiment, each satellite will orbit past the same earth position in six hours, or four times a day. In one embodiment, the time it takes to drift the width of a spot beam covering subscriber terminals (one of the two hundred beam hopping spot beams) is approximately 2.8 minutes (168 seconds). For LEO satellite embodiments, these will orbit at a higher rates, such as 11.25 periods per day corresponding to an orbital period of 128 minutes or less.

Figure 5:
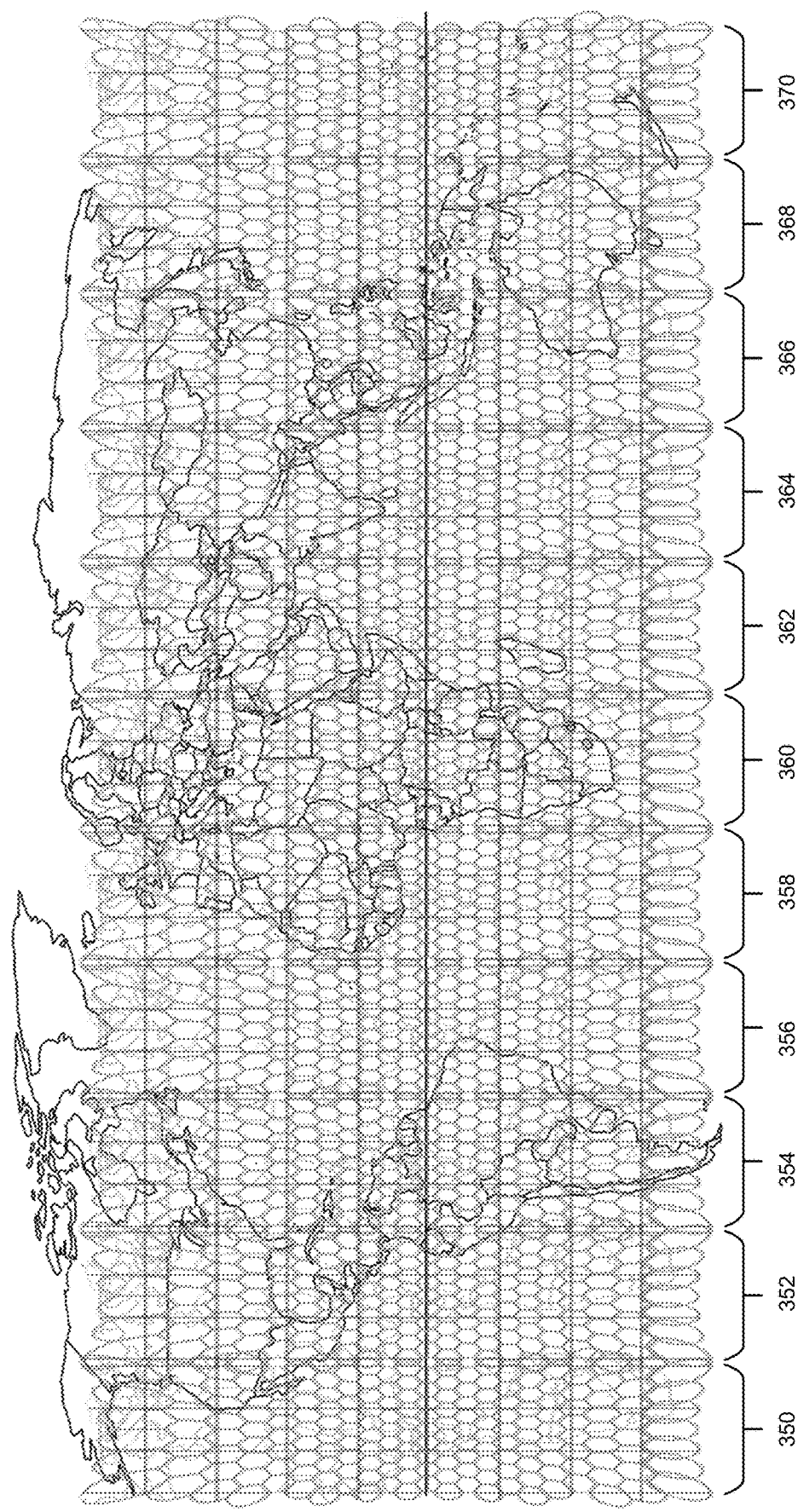
FIG. 5 is a map of the world, showing the beam maps for eleven satellites.

FIG. 5 shows the same map of the world as FIG. 4, with the beam maps (the Field of Regard) for each of the satellites depicted over the map. For example, satellite 302 projects beam map 350, satellite 304 projects beam map 352, satellite 306 projects beam map 354, satellite 308 projects beam map 356, satellite 310 projects beam map 358, satellite 312 projects beam map 360, satellite 314 projects beam map 362, satellite 316 projects beam map 364, satellite 318 projects beam map 366, satellite 320 projects beam map 368, and satellite 322 projects beam map 370. Note that the satellites 302-322 are constantly moving west to east; therefore, beam maps 350-370 are also moving west to east, and are never stationary (in one embodiment). As can be seen, adjacent satellites have adjacent beam maps and adjacent Fields of Regard when operating the satellites. In one embodiment, the beam maps of adjacent satellites overlap so that among the constellation's satellites there is continuous coverage around the globe; however, there may be gaps in coverage at the north and south poles. That is, the beam map of each satellite is adjacent to a beam map on the adjacent satellite to provide a composite beam map that circumnavigates the Earth. For lower orbits, the Fields of Regard and Fields of View will cover a smaller area of on the earth's surface.

Figure 6:
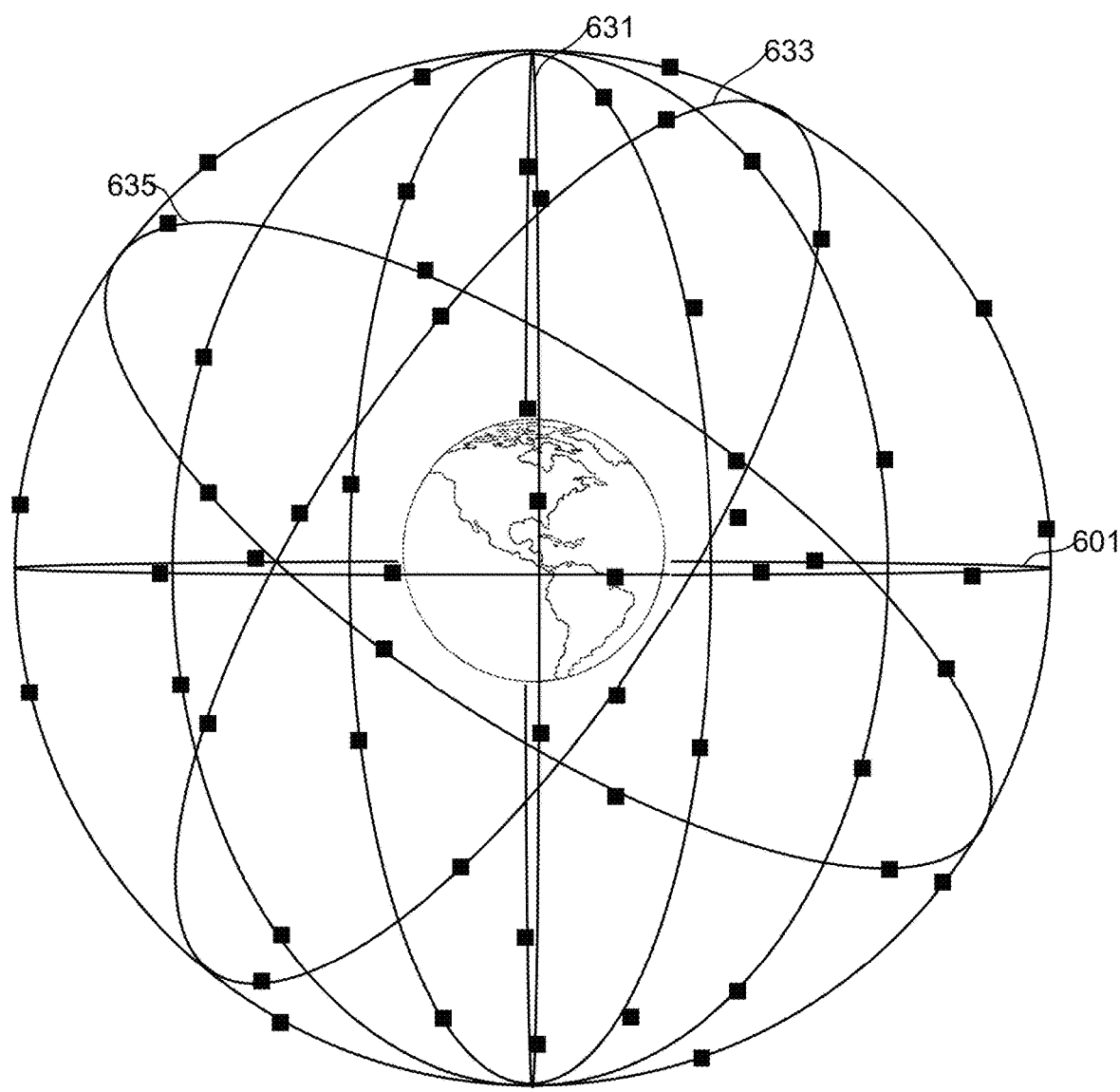
FIG. 6 illustrates a low earth orbit (LEO) constellation around the earth.
Figure 7B:
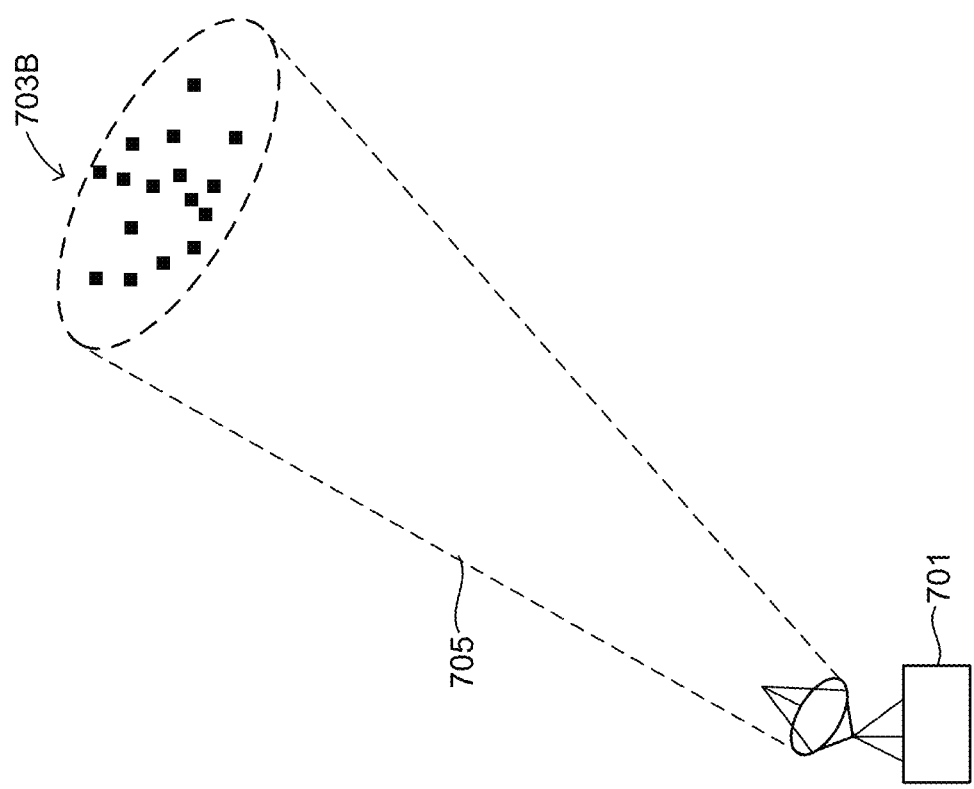
FIGS. 7A and 7B illustrate a cluster of satellites launched in a common rocket shortly after being dispersed from the launch vehicle and after further dispersing for some time.

To more fully cover the earth's surface, a constellation of satellites can be used, where FIG. 6 illustrates a LEO constellation, where the relative altitude of the orbits is somewhat exaggerated for the LEO example. In addition to the satellites along the equatorial orbit 601 as illustrated in FIG. 4, FIG. 6 also includes orbits through the poles (such as 631) and orbits at various other inclinations relative to the equator (such as 633 and 635). Along each of these orbit planes, one or more satellites orbit the earth. A constellation of communication or observation satellite will typically have a number of such orbit planes and a number satellites on each orbit plane so that one or more of the constellation's satellites will have a region of interest on the earth's surface within the satellites' Fields of View. To establish or augment a constellation of satellites, a satellite can be launched by rocket and placed at or near its desired orbit. However, it more cost effective to launch several satellites together, deploy them together, and then have the satellites more themselves to their respective final orbits. To save on the required fuel, and consequent weight, needed for the satellites, they will often spread out from the position of deployment as a relatively slow rate. Because of this, as seen from the earth, the result will be a cluster of satellites located within a narrow field of view. This situation is illustrated in FIGS. 7A and 7B.

Figure 7A:
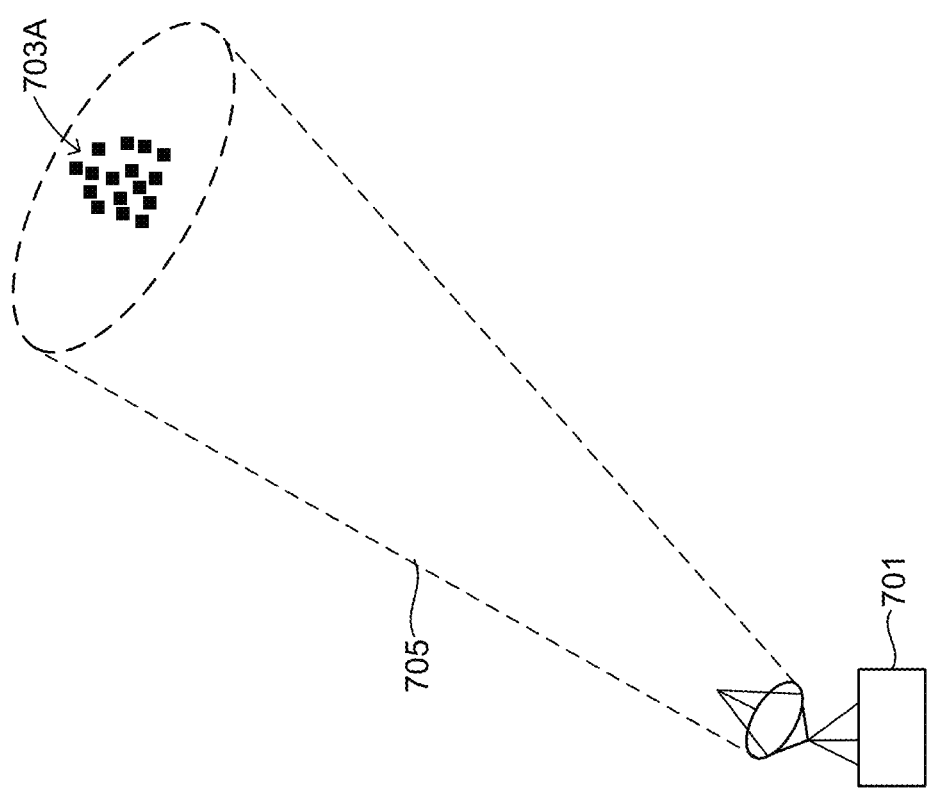

FIG. 7A illustrates a cluster of satellites 703A launched in a common rocket shortly after being dispersed from the launch vehicle. In one embodiment, a single launch vehicle might dispense 16 satellites. The satellites are deployed from the launch vehicle and propel themselves toward their intended orbits. The cluster of satellites 703A is initially quite compact and within a narrow field of view as seen from earth. For satellites to be placed into a LEO constellation, the cluster 703A will be orbiting about a point on the earth's surface every 90-120 minutes or so. This allows the cluster 703A to pass through the field of view 705 an antenna 701 that, if aligned to have its field of view 705 covering the region of sky through which the cluster 703A passes periodically, the antenna 701 can monitor one or more satellites of the cluster. Although the individual satellites are only periodically within the field of view 705 of antenna 701, this allows for the antenna 701 to monitor the trajectory, along with health and safety information, of all satellites within the cluster as the satellites move into their intended orbits. FIG. 7B illustrates the cluster 703B at a later time when the cluster 703B is less compact, but still passes with in the field of view 705 of antenna 701. The monitoring of this status information involves a relatively low amount of data, relative to amount of data transferred once a communication satellite, for example, is in position and in active operation, and need not be constantly monitored. As the cluster 703A/B passes through the field of view 705 of antenna 701, instructions can also be sent to satellites of the cluster from the antenna 701.

Under a conventional arrangement, although all of the satellites within the cluster 703A or 703B might fall within the field of view 705 of a single antenna 701, a single antenna will only monitor a single satellite at any given moment. Consequently, even though the a cluster of, for example, 16 satellites are located within a narrow opening angle as seen from the earth and fall within the field of view 705 of a single antenna 701, a group of the same number (e.g., 16) of antennas would be needed to monitor the cluster. To improve upon this, the techniques presented in the following describe a scalable signal processing system processing digitized spectrum received from LEO (or other types of) satellites, extracting multiple digital signals from multiple sources through multiple acquisition sites that is virtualized with high availability. Under this arrangement, an individual antenna can monitor multiple satellites concurrently, where each of the satellites transmits within a spectrum range, can be received by a single antenna, and then the composite signal can then be processed to extract the data of the individual satellites.

The described embodiments facilitate the centralized control and monitoring of large LEO satellite constellations from anywhere. The signal processing system can acquire and process multiple telemetry signals from satellites in LEO constellations during normal operations, as well as for signal acquisition and processing during constellation formation and also for contingency signal processing. The arrangement can also significantly reduce costs associated with ground equipment, replacing the classic baseband unit where one antenna monitors one satellite, and also increase the reliability and availability of telemetry information from the satellites. Although more generally applicable, the following description will mainly focus on an embodiment having a direct application to Low Earth Orbit Constellation (LEO) operations and management. These embodiments permit the acquisition and processing of multiple source (e.g., satellite) data streams and can use common architecture, data pooling and processing minimize resources required to operate large satellite constellations.

Figure 8:
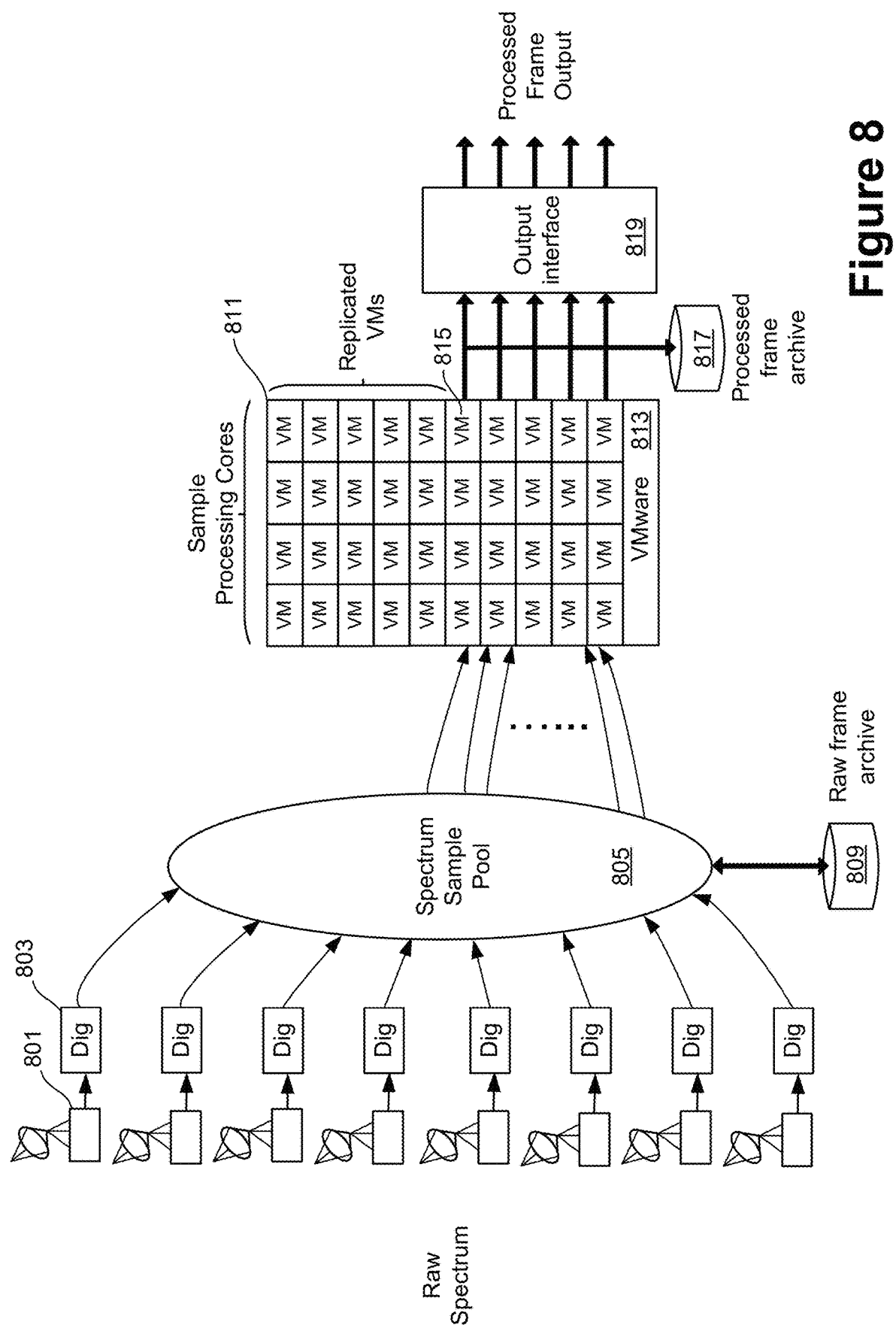
FIG. 8 is a block diagram for an embodiment of a scalable signal processing system.

FIG. 8 is a block diagram for an embodiment of a scalable signal processing system to process a digitized spectrum to extract multiple digital signals from multiple sources through multiple acquisition sites, where the processing is virtualized with high availability. One or more digitizers 803 can each receive an input signal from an antenna 801 or other input, such as a cable or fiber. A digitizer 803 can be co-located with an antenna 801, such as in an enclosure on the rear of the antenna, a shed or other structure within a few meters of the antenna 801 to hold electronics associated with the antenna 801. The input to a digitizer 803 from antenna 801 or other input can be a range (e.g., of 500 MHz) of raw spectrum, where (as described further in the following) this analog signal of raw spectrum can include signals from multiple satellites within its frequency band, such as from the cluster 703A or 703B that are passing through the field of view 705 of satellite 701 as illustrated in FIGS. 7A and 7B. For example, the eight antenna 801 represented in FIG. 8 could be located at a common location and each monitor a range of raw spectrum across one of eight visible orbit planes for a constellation.

Each of the digitizers 803 can create raw samples of the analog data it receives from a corresponding antenna 801 or other input, digitizing the analog input and forming it into frames of raw (i.e., unprocessed) data as a spectrum sample pool 805. The raw data of the spectrum sample pool 805 can be stored, without further signal processing, in a memory as a raw data archive 809. The memory of the raw spectrum archive 809 can also be co-located with one or more of the digitizers 803, so that raw frame archive 809 and one or more digitizers 803 could all be located in a structure adjacent to one or more of the antennas 801. The raw frame archive 809 can store the raw spectrum form each satellite with high precision, both for current processing and also for further processing.

The raw frames of data from the sample pool 805 can be supplied to a set of processing cores 811 directly from the digitizers 803, from the raw data archive, or both. For example, the cores 811 could process data from digitizers 803 as it comes into the spectrum sample pool 805, with the raw spectrum samples also being saved from the sample pool 805 into the raw frame archive 809, so that after some degree of initial processing of the raw spectrum, the processing cores 811 could then request additional raw frames of data from the archive 809 to perform more detailed processing on the raw frames informed by the initial round of processing.

The processing cores 811 can be located with or near the raw frame archive 809, the digitizers 803, or both, or be at a separate location. For example, the digitizers 803 and raw frame archive 809 can be co-located with one or more of the antennas 801, but with the processing cores 811 located remotely. In one set of embodiments, the sample processing can be spread across 160 individual cores, such as individual core 815, allowing for the parallel processing of the raw frames, where these can be implemented through virtual machine processing on 16 hosts each of 10 core, for example. These cores replicate as virtual machines that can be overseen by the Virtualization Management (VMware) 813. The processed data can then be stored in a memory as a processed frame archive 817. If the processing cores 811 are not co-located with the raw frame archive 809, the raw frame archive 809 and the processed frame archive 817 will typically use different memory resources, although in some embodiments the two archives could share memory.

The processed frames can be selectively routed to be received by applications and data bases directly form the processing cores 811 and the processed frame archive 817 by way of an output interface 819. There can be a number of different recipients of the processed frame output, with a different set of data being sent to each of the customers.

Figure 9:
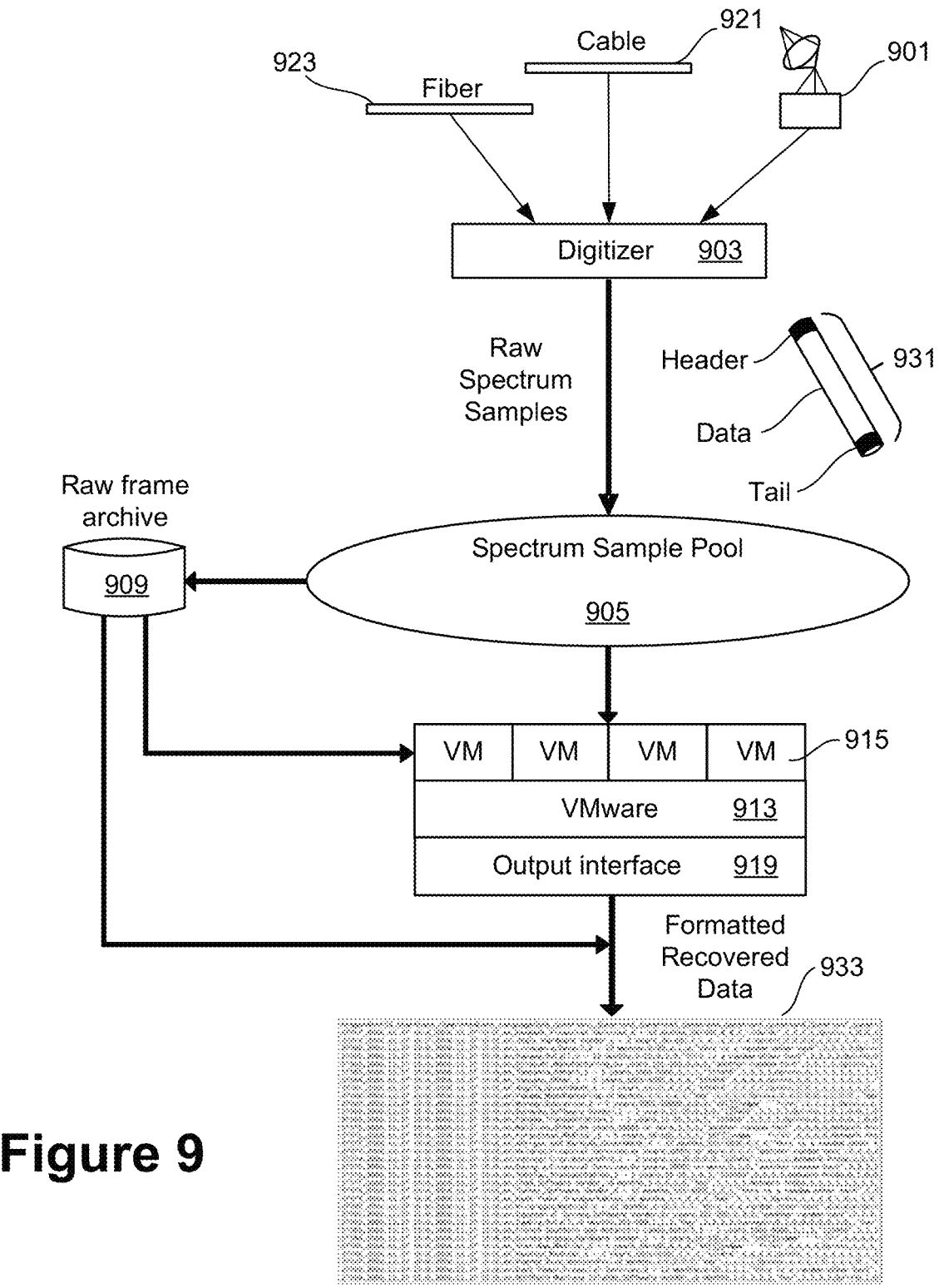
FIG. 9 considers the operation of some element of FIG. 8 in more detail.

FIG. 9 considers the operation of some element of FIG. 8 in more detail. The received spectrum can come from a satellite 901, which can be in proximity to the digitizer 903, or at another location. The data can also be received from a cable 921, fiber 923, or other source; and although the following discussion is in the context of satellite data, the techniques can be applied more generally. Continuing with the satellite embodiments, the multiple sources and media can be employed to capture and access spectrum from cable 921, fiber 923, and antennas 901 looking at the visible space/sky. A wideband (up to 100 MHz, for example) digitizer 903 can be connected to these spectral energy sources.

The digitizer 903 receives the analog raw spectrum and performs spectrum digitizing from the multiple sources to form the data resource pool 905. In one set of embodiments, the digitizer can be an intermediate frequency (IF) digitizer that digitizes up to Max Bandwidth (e.g., 100 MHz) of radio frequency (RF) spectrum at L-Band (i.e., from 1 to 2 GHz) or 70 MHz. The digitizer 903 can form the raw spectrum in a series of frames, as illustrated at 931. A frame is a digital data transmission unit and typically includes frame synchronization by use of a sequence of bits or symbols that indicate to the receiver the beginning (the header) and end (the trailer) of the payload data within the stream of symbols or bits. When a frame is received during frame transmission, the system ignores the data until it detects a new frame synchronization sequence.

The raw frames created by the digitizer 903 create the pool of spectrum 905 to process enabling a "signal aperture". The output from each digitizer for each antenna (or other input) can be pooled and the digitized spectrum can then be archived in the raw frame archive 909 to ensure processing of the digitized spectrum. From the raw frame archive 909 or directly from the digitizer 903, the spectrum sample pool 905 is then availability to multiple signal processing elements 915.

The processing in the in the signal processing cores 915 can be embodiments of Software Defined Radios with Multi-Mode Demodulators (SDRs/SD-MM-DMs). The software defined radio processing can be similar to what is used for digital radio for reception of a satellite radio network, except in that case that the goal is to extract a single signal for a selected station's radio signal that would have a high data rate, while here the goal is to be able to extract, or recover, multiple independent signals (trajectories and health data of multiple satellites) of a relatively lower data rate from the spectrum. A flexible demodulation capability is based on Software Defined Multi-Mode Demodulator(s) (SDD) employed to process spectrum from the pool using channelized demodulators and spread spectrum demodulators for synchronous systems.

The processing can be performed by a number of processing cores 915 that can be implemented as virtual machines (VMs) controlled by VMware 913. This allows for a virtualizing of SDR/SDD in a multi-core environment that permits the dynamic creation of signal processing chains and maximizes use of processor resources. The parallel processing of digitized spectrum by multiple instances of SDR/

SDDs in the cores 915 allows for the processing from multiple sources, carriers, or emitters simultaneously. Additionally, the high availability architecture for the virtualized environment can be used to assure non-stop availability of redundant SDR/SDD processors.

The formatted frames recovered data 933 extracted by the processing cores 915 from the spectrum can be archived, supplied by an output interface 919 to customers' applications and data bases, or bot. The real time signal data becomes persistent within milliseconds of receipt. This can assure the repeatable availability of time domain data. The system design allows for edge data encryption/decryption, so that selected data sets can be securely supplied to different customers.

In the embodiments presented here, the SDR/SDD elements (SDE) are virtualized into Virtual Machines (VMs) to create stand-alone "Signal Processing Engines" for processing of the digitized signals contained in the digitized spectrum. The pool of computational resources provided by the multiple processing cores establish a host for the virtualized SDEs and the Virtualization Management (VMware 913) can assign the cores 915 to SDEs to run.

The replicated VMs, as illustrated by the cores 811 of FIG. 8, provide a high availability architecture. In one embodiment, the SDR VM processing could be based on 10 cores in each of 16 hosts. By have redundant cores, spare SDE VMs may be instantly assigned if a fault is found in an active SDE VM. Additionally, the structure scales through the VM management 813. This structure provides a hot-swap environment for network modules, processor modules, and power supplies, so that system is designed to be never taken down. Consequently, loss of data/failure is minimized through such a high availability architecture of replicated VMs and automated fault detection and fail-over in a system that by adding or deleting VMs.

Referring back to FIG. 8, when the system is in operation the spectrum from each antenna 801 is digitized by the corresponding digitizer 803 and placed in the spectrum pool 805. The different signals within the spectrum from the different satellites can be delineated by their source (physical portion of sky/space) and spectral range, where each of the signals will have a center frequency ($F_c$) and Spectral Bandwidth ($S_{bw}$).

Figure 10:
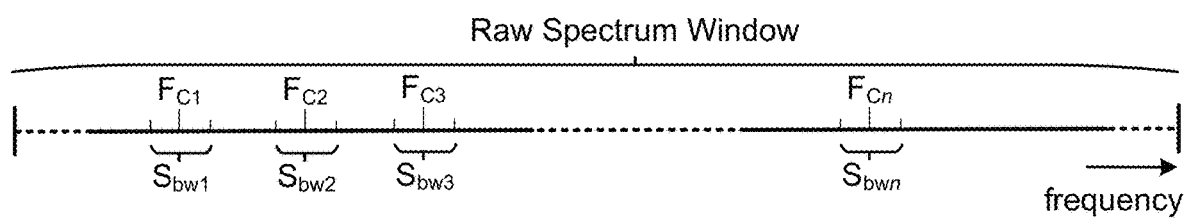
FIG. 10 illustrates the placement of the center frequencies and spectral bandwidths within the spectrum.

FIG. 10 illustrates the placement of the center frequencies and spectral bandwidths within the spectrum. As illustrated, a band of raw spectrum of, for example, 800 MHz can hold a number of frequency centers ($F_{c1}$, $F_{c2}$, . . . ), each with a corresponding spectral bandwidth ($S_{bw1}$, $S_{bw2}$, . . . ), for the different satellites being monitored. Multiple SDR/SDD elements (SDEs) are activated and configured in the processing cores 811. To configure an SDR, the data is read from a specific source antenna and spectrum, corresponding to a place in the sky and frequency range for targets. A specific frequency center $F_c$ and a bandwidth filter for $S_{bw}$ can be set to limit spectrum being processed to an area of interest. The multi-mode demodulators (MM-DM) can be configured to be channelized or as a spread spectrum demodulator to perform clock and data recovery (bit/symbol rate) and set framing parameters.

The processed frames are output to a data pool identified by header/framing metadata and can be stored in the processed frame archive 817 for data integrity, safety, and redundancy. A user can then read the processed data to user applications either from the pool of processed frames as supplied by the processing cores 811 or from the processed frame archive 817.

Figure 11:
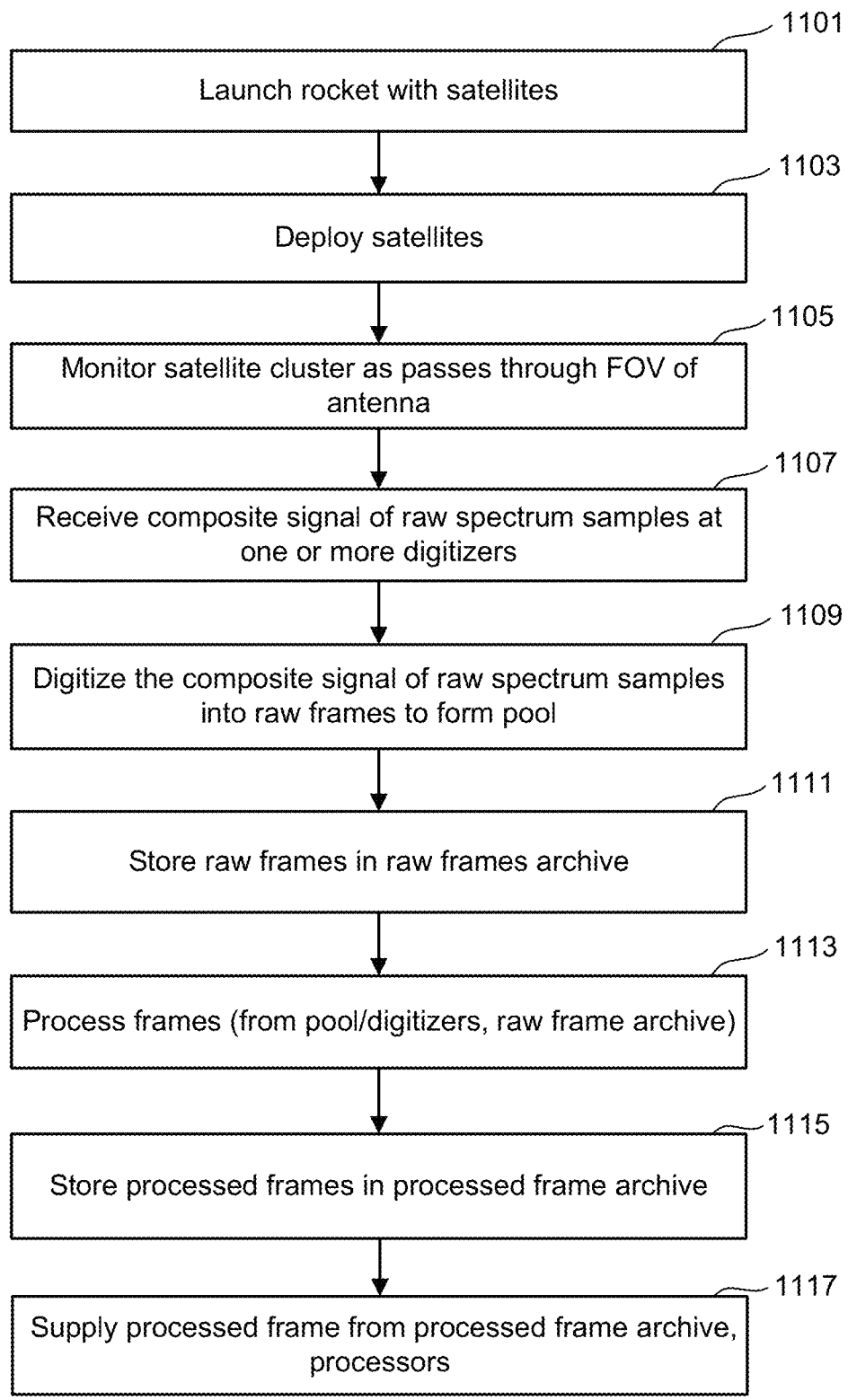
FIG. 11 is a flowchart describing one embodiment for the use of the system of FIG. 8 to monitor one or more satellites.

FIG. 11 is a flowchart describing one embodiment for the use of the system of FIG. 8 to monitor one or more satellites as illustrated in FIG. 7. The flow of FIG. 11 includes the launch and initial deployment of a group of satellites to illustrate a particular example of use, but the system can also be used with satellites previously in space or with signals from other, non-satellite sources.

Beginning with step 1101, a rocket is launched carrying a number of satellites, which are then deployed at step 1103 forming a cluster as illustrated at 703A of FIG. 7A. The satellites of the cluster 703A will disperse as they move towards the eventual orbits, such as illustrated at FIG. 7B for the cluster 703B. As the cluster 703A, 703B passes through the field of view of antenna 701, the satellites can be monitored at step 1105 to determine status information, such as trajectories and health information, for the satellites. As the satellites in the initial cluster 703A further disperse and eventually reach their destined orbit, the eventually no longer pass through the field of view 705 of antenna 701 and are passed off to other antenna for monitoring and also for the transmission of data for the satellite's intended purpose (such as a communication satellite) as described above with respect to FIG. 1. As the satellites pass through the field of view 705 of antenna 701, commands can also be transmitted to the satellites.

The raw spectrum received at the antenna 701 from the cluster of satellites 703A, 703B is then digitized at step 1107. Referring now to FIG. 8, the antenna 701 corresponds to one of the antenna 801 that then supplies the received raw spectrum to a corresponding one or more of the digitizers 803. Although described here for a single one of the antennas 801, the processes can be performed in parallel for multiple satellites or other sources. At step 1109, the raw spectrum containing the composite of signals from the satellites is digitized, turning the raw spectrum into frames forming the spectrum sample pool 805, with the raw frames being stored in the raw frame archive 809 at step 1111.

The raw frames are processed by the processing cores 811 at step 1113, where the raw frames can be accessed from sample pool 805 directly from the digitizers 803 and the raw archive frame archive 809. The raw frames from a single antenna 801 can be processed in parallel in multiple ones of the processing cores 815, and raw frames from different ones of the antennas 801 can also be processed in parallel. The processing of step 1113 is considered further with respect to FIG. 12.

The pool of processed frames can be stored in a processed frame archive at step 1115 as they are generated from the set of cores 811. The output interface 819 can supply the processed frames from the processed frame archive 817 and the processors 811, routing the frames to the applications and databases of customers as requested at step 1117.

Figure 12:
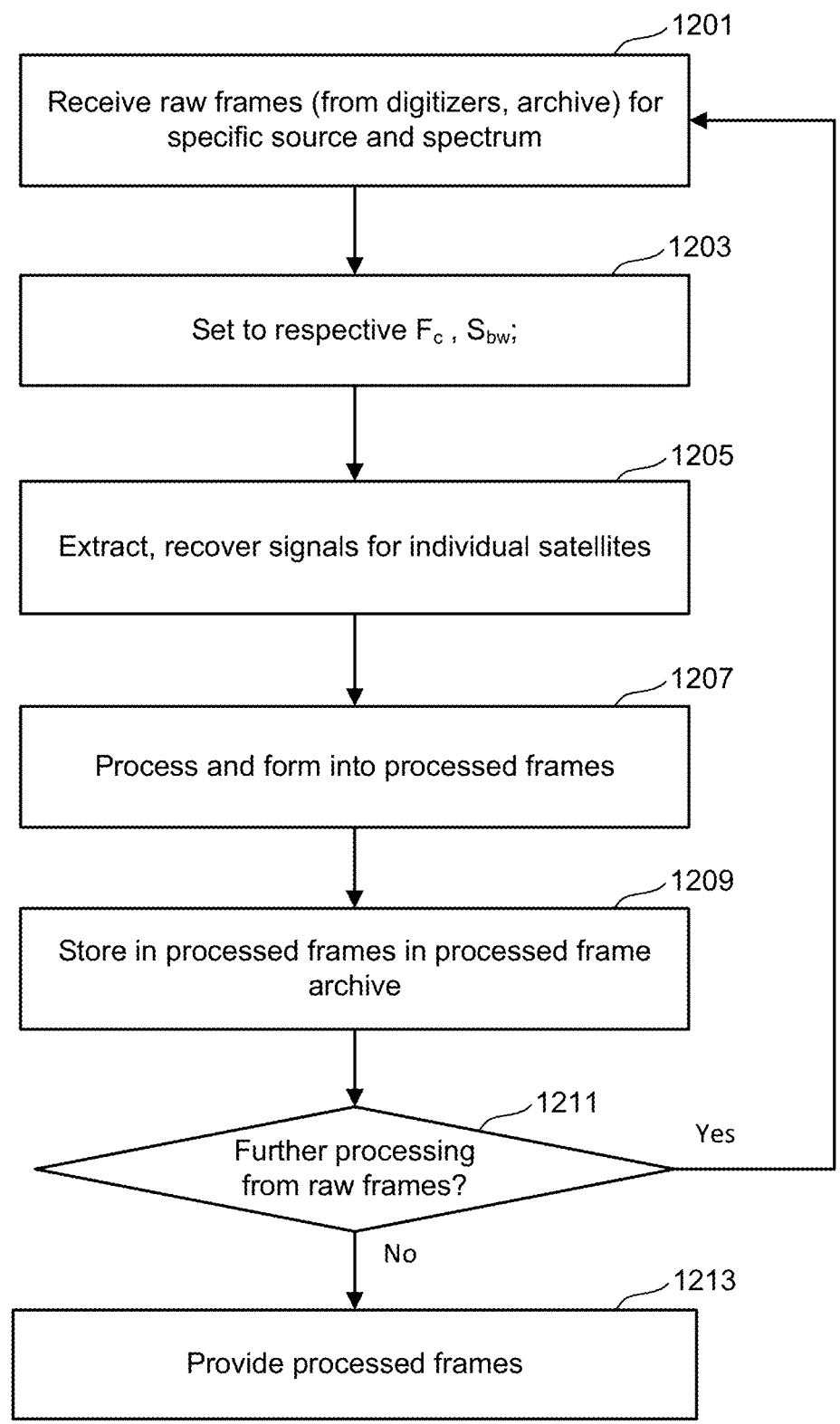
FIG. 12 is a flowchart describing one embodiment for the processing of FIG. 11.

FIG. 12 is a flowchart describing one embodiment for the processing of step 1113 of FIG. 11 with reference to FIG. 9. At step 1201, the processors 915 receives the raw frames 931 of the spectrum sample pool 905, either directly from the digitizers 903 or from the raw frame data archive 909, as represented by the respective paths from the pool 905 and archive 909. The raw frames can be processed in multiple ones of the processing cores 915 in parallel.

At step 1203, the processing cores 915 are configured for a particular source and spectral range of a frequency center and bandwidth ($F_c$, $S_{bw}$), with a corresponding recovered signal being extracted at step 1205. At step 1207 the processing cores 915 can then process the extracted signals, forming these into processed frames of the formatted recovered data 933 that can be stored into a processed frame archive at step 1209.

The formatted recovered data can be provided at this point, although in some embodiments further processing can be performed on the frames by going back to the raw frame archive 909, where additional processing of the raw frames can be informed through use of the process frames. This is represented schematically in FIG. 9 by the path from the raw frame archive to above the formatted recovered data 933. For example, once the data content from a first satellite is successfully extracted from the raw spectrum, this could be used to more successfully isolate and extract data for other satellites from the raw spectrum or to refine the data already extracted for the first satellite. In other examples, raw data from other antennas could be accessed to generated additional data for the same satellite. The decision on whether to perform such additional processing is performed at step 1211, where this could be in response to a request form a customer or based on the properties of the previously recovered data. As both the raw and processed frames are achieved, this decision need not be made in real time and the archives can be accessed at a later time if more or different processing is later wanted. If more processing is to be performed, the flow loops back to step 1201, but with the processing of step 1207 now informed by the previous processing; and if no further processing is to be performed at the time, the formatted processed data can be output at step 1213.

The described system allows for data to become "non-real time" as far up the signal processing chain as possible. As the digitized spectrum is archived after digitizing as a spectrum packet, the spectral data has become persistent and non-real time, allowing it to be distributed to multiple destinations and repeatably supplied as requested. It also allows for a "now and later" model, where spectral data may be re-processed at a later "more convenient" time for other products and as well as the original product for which it generated.

Relative to traditional carrier processing, the described spectral data processing can use software defined elements that permit a scalable system. It further allows the digitized spectrum to be processed for multiple purposes concurrently, including original purpose of data demodulation, but also spectrum monitoring (to look for interferers or other conditions) and auxiliary signals by processing the raw spectrum for what else may be there ("Easter eggs").

According to a first set of aspects, a system includes a plurality of digitizers, a first memory system, a plurality of processing cores, a second memory system, and an output interface. The plurality of digitizers is each configured to receive an analog signal of raw spectrum samples within a first frequency band, digitize the received analog signal, and form the digitized received analog signal into raw frames. The first memory system is configured to store the raw frames. The processing cores each are configured to: access the raw frames from the digitizers and from the first memory system; process the raw frames in parallel; extract a plurality of independent signals from the raw frames, each of the independent signals having a distinct center frequency with the first frequency band; and process the plurality of independent signals into processed frames. The second memory system is configured to store the processed frames. The output interface is configured to selectively supply the processed frames from the processing cores and the second memory system to one or more content receivers.

In other aspects, a method includes monitoring a plurality of satellites by a first antenna, each of the satellites transmitting an analog signal having a distinct center frequency within a first frequency band, and receiving the plurality of analog signals as a composite signal of raw spectrum samples at one or more digitizers. The composite signal of raw spectrum samples is digitized by one or more digitizers and the digitized composite signal of raw spectrum samples are stored in a first memory. The method also includes processing the composite signal of raw spectrum samples in a plurality of processing cores in parallel, where the processing includes: extracting a plurality of independent signals from the composite signal of raw spectrum samples, each of the independent signals corresponding to one of the distinct center frequency; and processing the plurality of independent signals. The processed independent signals are stored in a second memory and the processed independent signals can be selectively supplied from the processing cores and the second memory to one or more content receivers.

In further aspects, an apparatus includes a plurality of antennas configured to concurrently receive a plurality of independent signals within a first frequency band and provide a spectrum sample pool and a plurality of digitizers connected to receive the spectrum sample pool and generate therefrom digitized raw spectrum samples. A sample processor, connected to the digitizers, is spread across multiple cores and hosts and includes virtualization. The sample processor is configured to process the digitized raw spectrum samples concurrently in multiple cores to extract and process the plurality of independent signals and to output processed frame output from the plurality of independent signals to applications and databases.

The foregoing detailed description has been presented for purposes of illustration and description. It is not intended to be exhaustive or to limit the subject matter claimed herein to the precise form(s) disclosed. Many modifications and variations are possible in light of the above teachings. The described embodiments were chosen in order to best explain the principles of the disclosed technology and its practical application to thereby enable others skilled in the art to best utilize the technology in various embodiments and with various modifications as are suited to the particular use contemplated. It is intended that the scope of be defined by the claims appended hereto.

For purposes of this document, it should be noted that the dimensions of the various features depicted in the figures may not necessarily be drawn to scale.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

What is claimed is:

1. A system, comprising:
an antenna configured to monitor a signal of a raw spectrum window within a field of view of the antenna, the signal of the raw spectrum window including an analog signal from each of a plurality of satellites concurrently within the field of view, each of the satellites transmitting an analog signal having a different, distinct center frequency within the raw spectrum window;
one or more digitizers configured to:
 receive from the antenna the signal of the raw spectrum window, the signal of the raw spectrum window including a composite of the plurality of analog signals from each of the satellites concurrently within the field of view;
 digitize the signal of the raw spectrum window; and
 form the digitized signal of the raw spectrum window into frames;
a first memory configured to store the digitized signal of the raw spectrum window as frames;
one or more processors each configured to:
 access the frames of the digitized signal of the raw spectrum window from the one or more digitizers and from the first memory;
 process the frames of the digitized signal of the raw spectrum window in parallel;
 extract a plurality of independent signals from the digitized signal of the raw spectrum window, each of the independent signals corresponding to one of the distinct center frequencies; and
 form the plurality of independent signals into processed frames;
a second memory configured to store the processed frames; and
an output interface configured to selectively supply the processed frames of the independent signals from the one or more processors and the second memory to one or more content receivers in response to a corresponding request from the one or more content receivers.

2. The system of claim 1, wherein the one or more digitizers and the first memory are co-located.

3. The system of claim 1, wherein the one or more processors are configured to process the plurality of independent signals to extract trajectory data for the plurality of satellites.

4. The system of claim 1, wherein the antenna, the one or more digitizers and the first memory are co-located.

5. The system of claim 1, wherein the one or more processors includes one or more redundant processors and a management section configured to replace a faulty processor with a redundant processor to continue to process the plurality of independent signals into processed frames.

6. The system of claim 1, wherein the output interface is configured to encrypt the processed frames prior to supplying the processed frames to the one or more content receivers.

7. The system of claim 1, wherein the one or more processors are further configured to perform further processing on the raw frames using the processed frames, and to store the further processed frames in the second memory.

8. The system of claim 1, wherein one or more of the processors are implemented as replicated virtual machines.

9. A method, comprising:
monitoring by an antenna a signal of a raw spectrum window within a field of view of the antenna, the signal of the raw spectrum window including an analog signal from each of a plurality of satellites concurrently within the field of view, each of the satellites transmitting an analog signal having a different, distinct center frequency within the raw spectrum window;
receiving the signal of the raw spectrum window, the signal of the raw spectrum window including a composite of the plurality of analog signals from each of the satellites concurrently within the field of view at one or more digitizers;
digitizing the signal of the raw spectrum window by the one or more digitizers;
forming the digitized signal of the raw spectrum window into frames;
storing the digitized signal of the raw spectrum window in a first memory;
processing the digitized signal of the raw spectrum window in a plurality of processors in parallel, the processing including:
 extracting a plurality of independent signals from the digitized signal of the raw spectrum window, each of the independent signals corresponding to one of the distinct center frequencies; and
 processing the plurality of independent signals;
forming the processed independent signals into frames;
storing the processed independent signals in a second memory, wherein the second memory stores the processed independent signals as processed frames; and
selectively supplying the processed independent signals from the processors and the second memory to one or more content receivers, wherein the processed independent signals are selectively supplied in response to a request from one or more of the content receivers.

10. The method of claim 9, wherein processing the plurality of independent signals includes:
extracting trajectory data for the plurality of satellites.

11. The method of claim 9, wherein processing the plurality of independent signals includes:
extracting health data for the plurality of satellites.

12. The method of claim 9, further comprising:
while processing the composite signal of raw spectrum samples, detecting a fault in one of the plurality of processors; and
in response to detecting the fault in one of the plurality of processors, replacing the faulty processor with a redundant processor while continuing to process the plurality of independent signals.

13. The method of claim 9, further comprising:
encrypting the processed independent signals prior to selectively supplying the processed independent signals to the one or more content receivers.

14. The method of claim 9, further comprising:
subsequent to processing the plurality of independent signals, accessing the digitized composite signal of the raw spectrum window in the first memory; and
further processing the composite signal of the raw spectrum window using the processed plurality of independent signals.

15. The method of claim 9, further comprising:
configuring one or more virtual machines as the processors.

16. An apparatus, comprising:
a plurality of antennas each configured to monitor a signal of a raw spectrum window within a corresponding field of view of the antenna, the signal of the raw spectrum window including an analog signal from each of a plurality of satellites concurrently within the corresponding field of view, each of the satellites transmitting an analog signal having a different, distinct center frequency within the raw spectrum window;
a plurality of digitizers connected to receive the signal of the raw spectrum window within the corresponding fields of view of each of the plurality of antennas, each of the signals of the raw spectrum window including a composite of the plurality of analog signals from each of the satellites concurrently within the corresponding field of view, and generate therefrom digitized raw spectrum samples; and
a sample processor, connected to the digitizers, spread across multiple cores and hosts and including virtualization, the sample processor configured to process the digitized raw spectrum samples concurrently in multiple cores to extract and process a plurality of independent data streams from the plurality of independent signals and to output processed frame output from the plurality of independent data streams to applications and databases.

17. The apparatus of claim 16, further comprising:
a first memory configured to store digitized raw spectrum samples, the sample processor configured to access and process the digitized raw spectrum samples from the first memory; and
a second memory configured to store the processed frame output, the sample processor configured to output the processed frame output from the second memory.

18. The method of claim 9, wherein the plurality of satellites concurrently within the field of view of the antenna are deployed from a single launch vehicle in a common region.

19. The method of claim 9, wherein extracting the plurality of independent signals from the digitized signal of the raw spectrum window includes:
extracting an independent signal corresponding to a first one of the distinct center frequencies; and
using a result of extracting the independent signal corresponding to the first one of the distinct center frequencies, isolating and extracting an independent signal corresponding to a second one of the distinct center frequencies.

20. The system of claim 1, wherein the plurality of satellites concurrently within the field of view of the antenna are deployed from a single launch vehicle in a common region.

21. The system of claim 1, wherein, to extract the plurality of independent signals from the digitized signal of the raw spectrum window, the one or more processors are each further configured to:
extract an independent signal corresponding to a first one of the distinct center frequencies; and
using a result of extracting the independent signal corresponding to the first one of the distinct center frequencies, isolate and extract an independent signal corresponding to a second one of the distinct center frequencies.

* * * * *